United States Patent [19]

Hattori et al.

[11] Patent Number: 4,901,597
[45] Date of Patent: Feb. 20, 1990

[54] CONTINUOUSLY VARIABLE AUTOMOTIVE TRANSMISSION

[75] Inventors: Torao Hattori, Saitama; Masao Nishikawa, Tokyo, both of Japan

[73] Assignee: Honda Giken Kogyo Kabushiki Kaisha, Tokyo, Japan

[21] Appl. No.: 159,256

[22] Filed: Feb. 23, 1988

[51] Int. Cl.$^4$ ............................................. F16H 37/08
[52] U.S. Cl. ........................... 74/665 GE; 74/732.1; 475/66
[58] Field of Search ................. 74/689, 203, 665 GE, 74/701, 721, 730

[56] References Cited

U.S. PATENT DOCUMENTS

| | | | |
|---|---|---|---|
| 1,702,627 | 2/1929 | Bronander | 74/689 |
| 3,479,908 | 11/1969 | Kress et al. | 74/689 |
| 4,294,137 | 10/1981 | Piret et al. | 74/665 GE X |
| 4,455,888 | 6/1984 | Wayman et al. | 74/689 |
| 4,548,099 | 10/1985 | Wayman et al. | 74/689 |
| 4,548,100 | 10/1985 | Höhn | 74/689 |
| 4,559,850 | 12/1985 | Sakakibara | 74/868 |
| 4,599,916 | 7/1986 | Hirosawa | 74/689 |
| 4,605,112 | 8/1986 | Takano | 192/0.003 |
| 4,624,153 | 11/1986 | Itoh et al. | 74/695 X |
| 4,736,652 | 4/1988 | Shimamoto | 74/689 X |

FOREIGN PATENT DOCUMENTS

| | | | |
|---|---|---|---|
| 0004412 | 10/1979 | European Pat. Off. | 74/689 |
| 870199 | 3/1953 | Fed. Rep. of Germany | 74/689 |
| 887457 | 8/1953 | Fed. Rep. of Germany | 74/689 |
| 1185883 | 1/1965 | Fed. Rep. of Germany | 74/689 |
| 2025545 | 1/1980 | United Kingdom | 74/689 |

Primary Examiner—Dwight G. Diehl
Attorney, Agent, or Firm—Lyon & Lyon

[57] ABSTRACT

A continuously variable automotive transmission includes a fluid torque converter adapted to be connected to an engine and having a turbine shaft, a single driver gear or two driver gears fixedly mounted on the turbine shaft, and a V-belt continuously variable transmission mechanism. The V-belt continuously variable transmission mechanism comprises a driver pulley mounted on a driver shaft parallel to the turbine shaft, a driven pulley mounted on a driven shaft parallel to the turbine shaft, a V belt trained around the driver and driven pulleys, a forward gear rotatably mounted on the driver shaft and held in mesh with the single driver gear or one of the two driver gears, a foward clutch mounted on the driver shaft for selectively connecting and disconnecting the forward gear to and from the driver shaft, a reverse gear rotatably mounted on the driven shaft and held in mesh with the single driver gear or the other of the two driver gears through an idler gear, and a reverse clutch mounted on the driven shaft for selectively connecting and disconnecting the reverse gear to and from the driven shaft.

7 Claims, 2 Drawing Sheets

CONTINUOUSLY VARIABLE AUTOMOTIVE TRANSMISSION

BACKGROUND OF THE INVENTION

The present invention relates to a continuously variable automotive transmission comprising a fluid torque converter and a continuously variable transmission mechanism employing a V belt.

There are several known continuously variable automotive transmissions in which engine power is transmitted through a V-belt continuously variable transmission mechanism, either through a fluid torque converter or clutches and through a speed reducer gear train for driving vehicle wheels, such as U.S. Pat. Nos. 4,548,100, 4,559,850, 4,605,112 and 4,624,153 and the two Japanese Patent Publications noted below.

Japanese Laid-Open Patent Publication No. 55-63051 discloses a continuously variable automotive transmission wherein the turbine shaft of a fluid torque converter is disposed coaxially with the driver shaft of a V-belt continuously variable transmission mechanism, and the driven shaft thereof is coupled to either a gear mechanism including two parallel gear trains for selecting forward and rearward gear positions or a forward-/rearward-gear-position selecting mechanism including a clutch and planetary gear mechanism which are arranged parallel to each other.

Another continuously variable automotive transmission disclosed in Japanese Laid-Open Patent Publication No. 57-192666 includes a forward/rearward-gear-position selecting gear mechanism disposed coaxially with the turbine shaft of a fluid torque converter.

With the conventional arrangements, since the turbine shaft and the driver shaft are positioned in coaxial relation to each other and the forward/rearward-gear-position selecting mechanism (which may comprise two gear trains or a clutch and a planetary gear mechanism) is coupled to either the driven shaft or the driver shaft, the conventional continuously variable transmissions are of axially large dimensions, and contain a large number of gears. Further, the drive torque is transmitted through the V-belt continuously variable transmission mechanism not only when the automobile is moving forwardly, but also when it is moving rearwardly.

SUMMARY OF THE INVENTION

It is an object of the Present invention to provide a continuously variable automotive transmission which has a reduced number of gears for selecting forward and rearward gear positions, is of smaller axial dimensions and of a reduced size, and increases the service life of a V belt used in a V-belt continuously variable transmission mechanism by not transmitting torque through the V-belt continuously variable transmission mechanism when the automobile is running rearwardly.

According to the present invention, the above object can be achieved by a continuously variable automotive transmission for transmitting power from an engine that includes a fluid torque converter adapted to be connected to the engine and having a turbine shaft, driver gear means fixedly mounted on the turbine shaft, and a V-belt continuously variable transmission mechanism. The V-belt continuously variable transmission mechanism comprises a driver pulley mounted on a driver shaft parallel to the turbine shaft, a driven pulley mounted on a driven shaft parallel to the turbine shaft, a V-belt trained around the driver and driven pulleys, a forward gear rotatably mounted on the driver shaft and held in mesh with the driver gear means, a forward clutch mounted on the driver shaft for selectively connecting and disconnecting the the forward gear to and from the driver shaft, a reverse gear rotatably mounted on the driven shaft and held in mesh with the driver gear means through an idler gear, and a reverse clutch mounted on the driven shaft for selectively connecting and disconnecting the reverse gear to and from the driven shaft. The driver gear means may comprise a single driver gear meshing with the forward and idler gears or two driver gears meshing with the forward and idler gears, respectively.

The above and other objects, features and advantages of the present invention will become more apparent from the folowing description when taken in conjunction with the accompanying drawings in which preferred embodiments of the present invention are shown by way of illustrative example.

DESCRIPTION OF THE PREFERRED EMBODIMENTS

Figure 1:
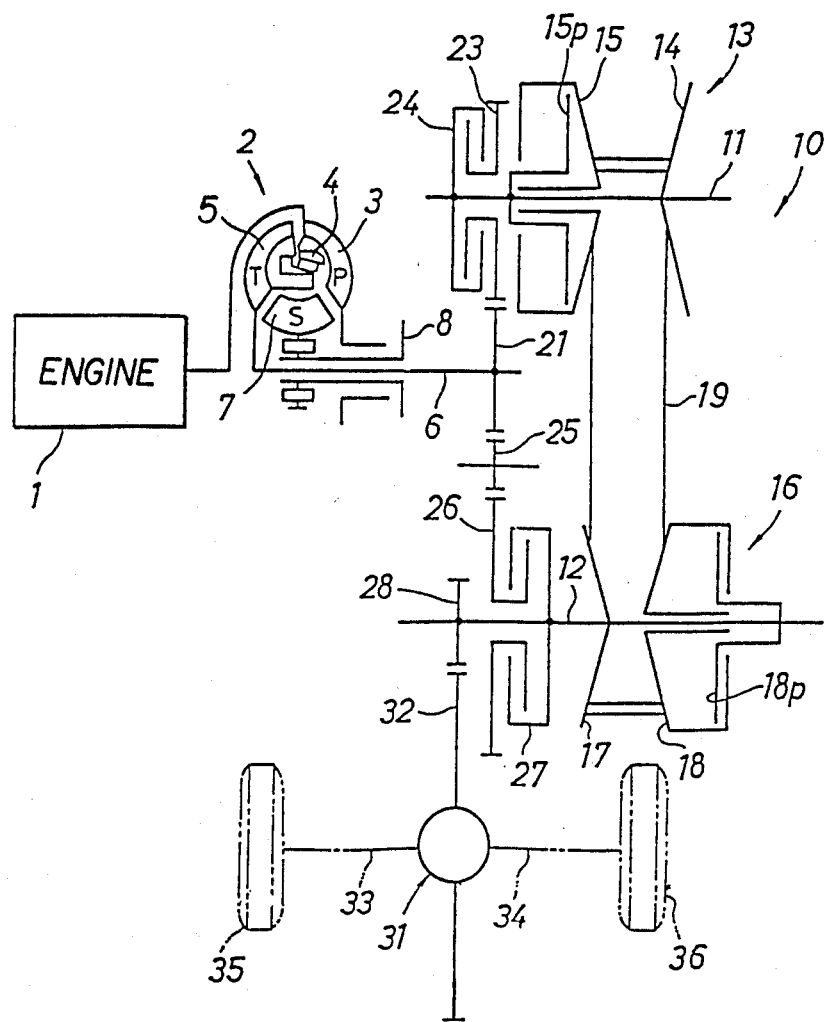
FIG. 1 is a schematic view of the power train of an automobile incorporating a continuously variable transmission according to an embodiment of the present invention.

FIG. 1 schematically shows a continuously variable transmission according to an embodiment of the present invention, the continuously variable transmission being incorporated in the power train of an automobile having an engine E. The engine E is mounted such that its crankshaft is directed in the transverse direction of the automobile. The continuously variable transmission generally includes a fluid torque converter 2 and a V-belt continuously variable transmission 10. Engine power from the engine 1 is applied to a pump 3 of the fluid torque converter 2 which has a direct coupling clutch 4. When the pump 3 is rotated by the engine power, a turbine 5 is rotated to rotate a turbine shaft 6 about its own axis. The fluid torque converter 2 also has a stator 7 including a stator shaft 8.

The turbine shaft 6 is fixed at its righthand end (as shown in FIG. 1) to a driver gear 21. The v-belt continuously variable transmission 10 has a driver shaft 11 and a driven shaft 12 which extends parallel to the turbine shaft 6. The driver shaft 11 supports a forward gear 23 rotatably mounted on its lefthand end and meshing with the driver gear 21, and also supports a hydraulically operated multiple-disc forward clutch 24 on the lefthand side of the forward gear 23. A driver pulley 13 is mounted on the driver shaft 11 on a righthand portion thereof. The driver pulley 13 comprises a fixed pulley member 14 on the righthand end of the driver shaft 11 and a movable pulley member 15 positioned on the lefthand side of and spaced from the fixed pulley member 14. The movable pulley member 15 is movable on and along the driver shaft 11 toward and away from the fixed pulley member 14 by means of a piston 15p on the driver shaft 11.

The driven shaft 12 supports on its righthand portion a driven pulley 16 comprising a fixed pulley member 17 positioned on the righthand portion of the driven shaft 12 and a movable pulley member 18 located on the righthand side of the fixed pulley member 17 and movable toward and away from the fixed pulley 17 by means of a piston 18p. A metallic V belt 19 is trained around the driver pulley 13 and the driven pulley 16. The power can be transmitted from the driver shaft 11 to the driven shaft 12 through the driver pulley 13, the V belt 19, and the driven pulley 16 at a continuously variable ratio responsive to operation of the pistons 15p, 18p.

A reverse gear 26 is rotatably mounted on the driven shaft 12 at its lefthand portion. The reverse gear 26 meshes with an idler gear 25 held in mesh with the driver gear 21. A hydraulically operated multiple-disc reverse clutch 27 is disposed on the driven shaft 12 rightwardly of the reverse gear 26. A final speed reducer gear 28 is fixedly mounted on the driven shaft 12 at its lefthand end leftwardly of the reverse gear 26. The final speed reducer gear 28 is held in mesh with a ring gear 32 of a differential 31 which is operatively coupled to drive axles 33, 34 connected respectively to automobile wheels 35, 36.

When the automobile is moved in a forward direction, the forward clutch 24 is engaged or ON, the reverse clutch 27 is disengaged or OFF, and engine power from the engine 1 is transmitted as follows: The engine power is first applied through the fluid torque converter 2 to the turbine shaft 6 and then through the driver gear 21, the forward gear 23 and the forward clutch 24 to the driver shaft 11. The power is then transmitted from the driver pulley 13 through the V belt 19 and the driven pulley 16 to the driven shaft 12, from which it is transmitted through the final speed reducer gear 28, the ring gear 32, the differential 31, and the drive axles 33, 34 to the respective wheels 35, 36. The engine power can thus be transmitted to the wheels 35, 36 at a continuously variable transmission ratio. Since the reverse clutch 27 is disengaged at this time, the reverse gear 26 is freely rotated on the driven shaft 12 in the direction opposite to the direction in which the driven shaft 12 is rotated about its own axis.

For moving the automobile in the reverse direction, the forward clutch 24 is disengaged or OFF and the reverse clutch 27 is engaged or ON. The engine power is transmitted from the driver gear 21 through the idler gear 25 to the reverse gear 26 at a constant gear ratio thereof, from which it is transmitted via the reverse clutch 27 to the driven shaft 12. At this time, because of the intervening idler gear 25, the driven shaft 12 is rotated in the opposite direction to that in which it is rotated when the automobile runs in the forward direction. The wheels 35, 36 are now rotated in the reverse direction. Although the driver shaft 11 is also rotated in the opposite direction by the driven pulley 16, the V belt 19, and the driver pulley 13 at this time, no torque is transmitted through the V belt 19 since the forward clutch 24 is disengaged and the forward gear 23 is freely rotated on the driver shaft 11.

The turbine shaft 6, the driver shaft 11, and the driven shaft 12 are arranged parallel to each other. The turbine shaft is operatively connected to the driver shaft 11 through the driver gear 21 and the forward gear 23, or to the driven shaft 12 through the driver gear 21, the idler gear 25, and the reverse gear 26. Since the various gears 21, 23, 25, 26 may be disposed substantially in axial alignment, the number of gears required can be reduced and the axial dimension of the transmission can be reduced.

The forward gear 23 on the driver shaft 11 is disposed between the driver pulley 13 and the forward clutch 24, and the reverse clutch 27 on the driven shaft 12 is disposed between the driven pulley 16 and the reverse gear 26. Thus, the forward and reverse clutches 24, 27 are positioned on each side of the train of the gears 21, 23, 25, 26. The final speed reducer gear 28 fixedly mounted on the driven shaft 12 is on one side of the gear train which is opposite to the driven pulley 16. The movable pulley member 15 of the driver pulley 13 is located close to the forward gear 23, and the fixed pulley member 17 of the driven pulley is located close to the reverse clutch 27. This arrangement minimizes the axial dimension of the continuously variable transmission.

Figure 2:
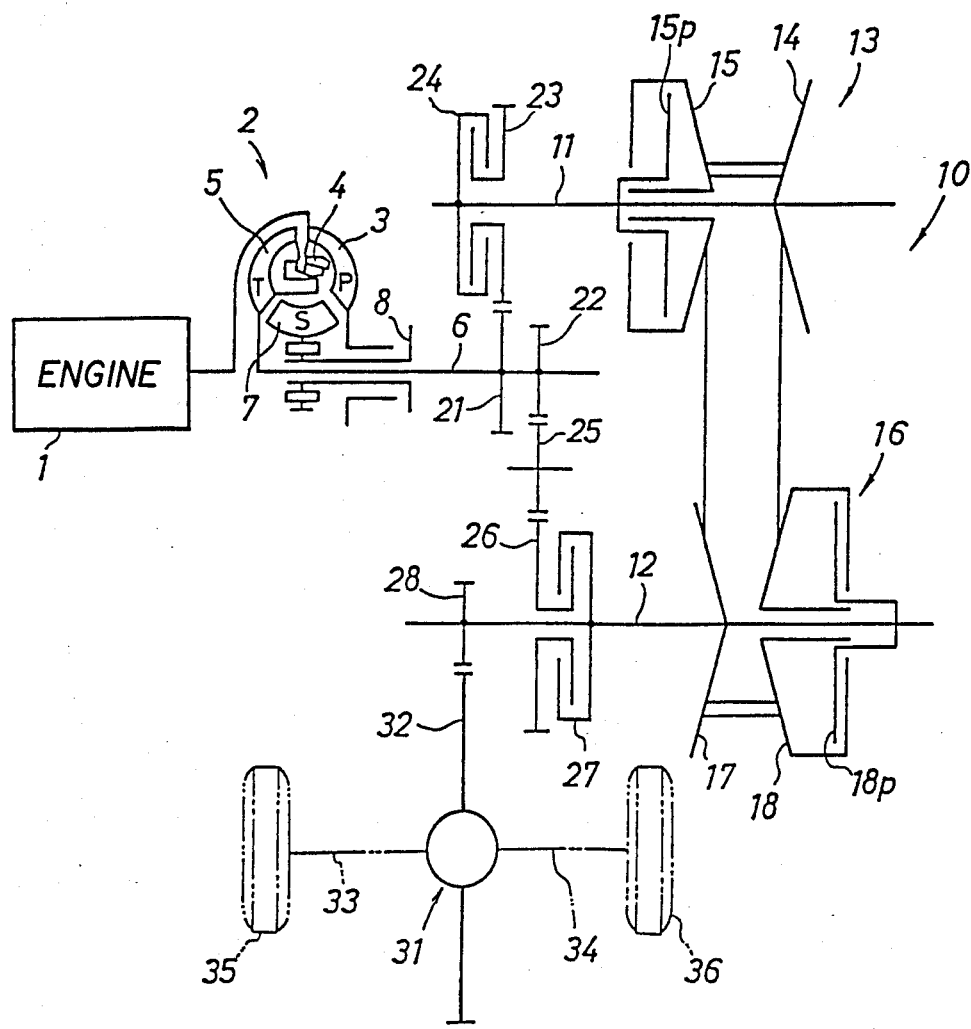
FIG. 2 is a schematic view of the power train of an automobile incorporating a continuously variable transmission according to another embodiment of the present invention.

FIG. 2 shows a continuously variable transmission according to another embodiment of the present invention. The continuously variable transmission shown in FIG. 2 is different from that of FIG. 1 only in that two juxtaposed driver gears 21, 22 are mounted on the righthand end of the turbine shaft 6, the lefthand driver gear 21 meshing with the forward gear 23 and the righthand driver gear 22 meshing with the idler gear 25. Since the driver gear 22 is separate from the driver gear 21 meshing with the forward gear 23, the speed reduction ratio of the reverse gear train can freely be selected irrespective of the forward gear train.

Although certain preferred embodiments have been shown and described, it should be understood that many changes and modifications may be made therein without departing from the scope of the appended claims.

We claim:

1. A continuously variable automotive transmission for transmitting power from an engine to automotive wheels, comprising:

a fluid torque converter adapted to be connected to the engine and having a turbine shaft;

driver gear means fixedly mounted on said turbine shaft; and a fixed ratio reverse and continuously variable ratio forward transmission mechanism including:

a driver shaft rotatably mounted parallel to said turbine shaft;

a driver pulley mounted on said driver shaft;

a driven shaft rotatably mounted parallel to said turbine shaft and driver shaft;

a driven pulley mounted on said driven shaft;

a V belt trained around said driver and driven pulleys;

said driver pulley and driven pulley having means for varying the drive ratio therebetween transmitted through the V belt;

a forward gear rotatably mounted on said driver shaft and held in mesh with said driver gear means;

a forward clutch mounted on said driver shaft for selectively connecting and disconnecting said forward gear to and from said driver shaft;

a reverse gear rotatably mounted on said driven shaft and held in mesh with said driver gear means through an idler gear;

a reverse clutch mounted on sid driven shaft for selectively connecting and disconnecting said reverse gear to and from said driven shaft; and said driven shaft continuously coupled through drive means to the automotive wheels for driving the automotive wheels whenever said driven shaft is rotated whereby the reverse driving of the automotive wheels is directly through said drive gear means, said reverse gear, said reverse clutch and said driven shaft without transmitting power through said V belt.

2. A continuously variable automotive transmission according to claim 1, wherein said driver gear means, said forward gear, said idler gear, and said reverse gear are disposed substantially in axial alignment with each other.

3. A continuously variable automotive transmission according to claim 1, wherein said driver gear means comprises a single driver gear held in mesh with said forward gear and said idler gear.

4. A continuously variable automotive transmission according to claim 1, wherein said driver gear means comprises two driver gears, one of said driver gears being held in mesh with said forward gear and the other driver gear being held in mesh with said idler gear.

5. A continuously variable automotive transmission according to claim 1, wherein said forward gear is disposed between said driver pulley and said forward clutch, and said reverse clutch is disposed between said driven pulley and said reverse gear.

6. A continuously variable automotive transmission according to claim 5, further including a final speed reducer gear fixedly mounted on said driven shaft and disposed on one side of said reverse gear and said reverse clutch which is opposite to said driven pulley.

7. A continuously variable automotive transmission according to claim 1, wherein said driver pulley comprises a fixed driver pulley member fixedly mounted on said driver shaft and a movable driver pulley member movably mounted on said drive shaft, said movable driver pulley member being disposed between said fixed driver pulley member and said forward gear and forward clutch, and wherein said driven pulley comprises a fixed driven pulley member fixedly mounted on said driven shaft and a movable driven pulley member movably mounted on said driven shaft, said fixed driven pulley member being disposed between said movable driven pulley member and said reverse gear and reverse clutch.

* * * * *